Patented Oct. 21, 1924.

1,512,897

UNITED STATES PATENT OFFICE.

VOLKMAR KOHLSCHÜTTER, OF BERNE, SWITZERLAND.

PROCESS OF OBTAINING SOLIDS OF PREDETERMINED DEGREES OF DISPERSION.

No Drawing.      Application filed August 30, 1921.  Serial No. 497,020.

*To all whom it may concern:*

Be it known that I, VOLKMAR KOHLSCHÜTTER, citizen of Germany, and a resident of Berne, Switzerland, have invented certain new and useful Improvements in a Process of Obtaining Solids of Predetermined Degrees of Dispersion, for which I have filed applications for foreign patents as follows: Germany, filed July 25, 1918; Great Britain, filed June 8, 1920; France, filed June 18, 1920; Italy, filed June 22, 1920; India, filed June 24, 1920; Australia, filed July 10, 1920; Argentina, filed July 23, 1920; Brazil, filed July 10, 1920, and of which the following is an exact specification.

In the use of solid substances as participants of reaction, catalyzers, absorption media and the like, the grade of dispersion of these substances is generally of decisive importance. Thus, for instance, an aluminium hydroxide which has to serve as an absorbent or as a filtering material must possess different properties from one intended for the production of colour lakes, and again, other kinds of dispersion are required for attaining the maximum efficiency when such hydroxide is used as a contact mass in catalytic reactions. Up to the present the procedure adopted has been to endeavour to produce the desired grade of dispersion by disintegrating the solid materials or by selecting a suitable formative reaction.

In the preparation of the solid substances by a precipitation reaction, the grade of dispersion cannot be controlled or rendered constant with the hitherto known and used methods of precipitation.

The process of the present invention has for its object to influence in an arbitrary manner and in a way which can 'e repeated at any time, the grade of dispersion exhibited by the products produced by such locally formed reactions. The invention is based on the observation that between the molecular and crystalline form of disintegration, a great number of intermediate stages exist which are not distinguishable externally. Now the present invention deals with precisely these forms of disintegration which are outside the range of the externally distinguishable forms of subdivision. Such purely externally distinguishable forms of the products, as for instance, the degree of granulation, are of subordinate importance in the present invention.

According to the invention, the process is carried out in such a manner that the condensation (i. e. the formation of a closer state of aggregation) of the components of the reaction is graduated, and by confining the reaction locally. By the local confining of the reaction is understood the carrying out of the reaction within the space in which the solid final product is situated after the reaction has taken place. If for example, a solid substance is caused to react with gases or liquids in such a manner that another solid body is produced which occupies the place of the first body, a locally confined reaction has been carried out. The components of the reaction in such a reaction are condensed in a limited space and a substance is produced which may differ entirely in character according to the degree in which this condensation is graduated. This graduation of the components of reaction can be effected in various ways. Firstly, by special selection of the solid originating materials, i. e., through the selection of substances with different molecular volume. In a crystallized compound the elementary atoms and groups are distributed in accordance with a system of points in a space net. They are situated at regular distances from one another and the individual atoms of any one kind are separated by those of the other constituents. Thus the nature of the solid originating material determines, so to speak, the concentration of the atoms which enter into reaction with the precipitant, because the other constituents previously combined with the latter, i. e., those which have been situated between them in the space net, determine by their nature and quantity, the distance separating the said atoms at the moment of their liberation from the compound. These form, so to speak, the skeleton for the new compound and determine the kind and grade of dispersion.

The conditions of dispersion of the final product can thus be influenced by the choice of originating materials of different molecular volume. However, this choice is not restricted to the uniformly crystallized substances, but graduation of the grade of dispersion can also be secured by the use of various modifications of formation of one and the same solid originating material or by the choice of substances in which the interior form or structure of their particles has been altered by preliminary treatment. Thus, for example, by dehydrating salts containing water of crystallization, originating materials can be obtained which cannot be produced in any other way. The altered form of the solid originating material, also determines a correspondingly modified grade of dispersion of the final product obtained after treatment with the precipitant, as compared with the final product obtained from a chemically equivalent originating material containing water of crystallization. In this connection emphasis should be laid on the fact that such preliminary treatment of the solid originating materials as merely results in mechanical and external alteration in the size of the grains, has no influence upon the grade of dispersion of the final product; only such a preliminary treatment which alters in some way the interior form of the solid originating materials, the structure of their particles or their manner of aggregation can produce the preliminary conditions for a special condition of dispersion of the final product.

Furthermore, the graduation in the condensation of the components of the reaction can be produced by altering the concentration of the precipitant or the temperature of reaction, by the addition of substances to the precipitant which do not themselves participate in the reaction, or by removing the resulting soluble by-products of the reaction from the reaction mixture as soon as they are produced. All these measures which probably exert an osmotic or capillary action upon the ultimate particles of the transformation products, and thereby modify their structure and aggregation, exert an influence upon the condition of dispersion of the final product. By combining two or more of these measures, the number of the stages of dispersion can be still further increased from the foregoing, it can be seen that, in the present process, there is no question of the production of chemical substances but only of influencing the internal structure of the individual grains of substances by physical means in order to obtain a physical process of formation which enters into the ultimate ultra-microscopical structural components of the visible particles. According to the process, it is possible by starting, for example, with a single solid originating material to obtain a series of any length of final products, which all have the same chemical composition, but are sharply differentiated as regards their internal structure. The internal difference of the chemically identical substances can be proved by the different behaviour of their colloidal solutions into which the final products can be immediately transformed, as well as by the different granular dimensions per unit weight of each individual substance.

The process is applicable for producing the desired properties of dispersion in metallic and other oxides, metals, carbonates, phosphates, and similar compounds which can be obtained by precipitation reactions, and especially the control of the grade of dispersion of the hydroxides and oxides of aluminium, chromium, nickel, iron and the rare earths. An important field of application is also the use of the substances with a high grade of dispersion, formed according to the process, as carriers for other substances, for example, for metallic or oxide catalyzers, which can be precipitated on the former during the process of formation or which may be incorporated therewith by after-treatment.

Finally, the grade of dispersion of metallic catalyzers can also be immediately controlled without the application of a carrier substance by using the present process in the known methods for the production of these substances, reduction of a solid originating material or subsequent reduction of previously prepared oxides.

To explain the invention more fully, the application of the process for aluminium hydroxide and aluminium oxide may be described in detail, taking as the first example the control of the grade of dispersion of aluminium hydroxide by the suitable choice of the originating material.

If crystallized ammonium alum—and for comparison crystallized aluminum sulphate containing water—(both substances screened to the same size) be introduced into cold ammonia solution of definite concentration, a rapid and complete transformation into aluminium hydroxide is effected, in both cases without visible solution. The resulting products can be easily filtered, washed and dried, and the characteristic form of the individual grains of the originating materials is maintained more or less completely, but nevertheless they have undergone certain alterations in volume, as has been ascertained by taking photo micrographs. Furthermore measure units have been made of the volume occupied by one gramme $Al_2O_3$ as hydroxide or oxide, from alum and sulphate in the dry state, and sifted to the same microscopical granular dimensions. Some of the results are set out in the following table:—

Table 1.

Volume of 1 gram $Al_2O_3$ in cc.

| Concentration of ammonia. | Hydroxide dried at 110°. | Ignited oxide. |
|---|---|---|
| (a) 10% | 1,89 | 1,63 |
| 5% | 2,57 | 2,17 |
| (b) 10% | 2,5 | 2,40 |
| 5% | 3,55 | 2,93 |

The solid originating material for a was ammonium alum and for b aluminium sulphate.

Ammonium alum, therefore, furnished a hydroxide or oxide of smaller granular dimensions but of higher grade of dispersion than aluminium sulphate.

In order to demonstrate the difference in the grade of dispersion of the two chemi- were treated in the same manner with very cally equivalent hydroxides obtained from the different originating materials, both dilute $\frac{n}{50}$ hydrochloric acid. Distribution to the state of milky turbid colloidal solution was immediately effected and even at this stage a sharp differentiation was apparent. The differences in the grade of dispersion is still more clearly revealed by the velocities of sedimentation. It has been found that the product obtained from ammonium alum is much more finely divided than that obtained from aluminium sulphate. If, therefore, for any chemical operation, for example, an aluminium hydroxide in an extreme state of subdivision is required, it is necessary to produce such hydroxide from ammonium alum and not from aluminium sulphate. Again, an aluminium hydroxide obtained from dehydrated alum has different granular dimensions and other properties. It differs from one obtained from alum containing water of crystallization, for example, by a much stronger catalytic activity, for example, in the decomposition of alcohol for the production of ethylene. By altering the conditions under which the originating material is dried the catalytic activity can be graduated at will. Similar results have been obtained by using aluminium sulphate with different proportions of water of crystallization as originating material for the production of aluminium oxide.

An example of modifying the grade of dispersion by using different concentrated solutions with one and the same originating material may also be given. If ammonium alum is treated with concentrated ammonia solution, an aluminium hydroxide is obtained with a high grade of dispersion, whereas, dilute ammonia solutions yield loose hydroxides of a lower grade of dispersion, as is shown by the following table:—

Table 2.

Volume of 1 gram $Al_2O_3$ in cc.

| Concentration of ammonia. | Hydroxide dried at 110°. | Ignited oxide. |
|---|---|---|
| 18% | 1,80 | 1,52 |
| 10% | 1,89 | 1,63 |
| 5% | 2,57 | 2,27 |
| 2,5% | 2,75 | 2,39 |

If the differences in dispersion shown in this table are compared with the differences between the hydroxide obtained from two different originating materials in table 1, they are found to be entirely differently graduated. The application of ammonia solutions of different concentration thus provides a further means of arbitrarily influencing the grade of dispersion of aluminium hydroxide.

The control of the grade of dispersion of aluminium hydroxide forms the basis of the above examples. By ignition aluminium hydroxide can be transformed into aluminium oxide. Now it is found that the process of ignition does not produce any essential alteration in the external form of the hydroxide. The grade of dispersion of the original substance therefore remains unchanged in the new substance. Only the space occupied by one gramme of aluminium oxide is slightly reduced in comparison with that previously occupied by one gramme of aluminium hydroxide, from which it can be concluded that the volume of the oxide is proportional to the volume of the hydroxide of that particular grade of dispersion from which the same is produced. The character of the oxide, like that of the hydroxide, consequently depends on the choice of the originating material and the other above-named factors, and is therefore variable therewith. Differences in the grade of dispersion of oxides which have been produced from hydroxides with different dispersion are partly distinguishable optically, and partly can be ascertained by comparison of the granular dimensions.

Similarly, other metallic oxides may be produced with a grade of dispersion which can be arbitrarily controlled. For example, a nickel preparation which is especially suitable for catalytic purposes can be obtained by carefully drying at 150° C., nickel sulphate containing water of crystallization, thereupon powdering and treating with a 10% solution of carbonate of soda. The washed basic mass is then dehydrated at 200° C. and reduced in hydrogen at 400° C.

I claim:

1. A process of obtaining solids of predetermined dispersion by removing interstitial atom-groups from the originating substance in solid form by a non-solvent reagent solution of adjusted concentration at a temperature which is adjusted according to the desired degree of dispersion in the precipitate.

2. A process of obtaining solids of predetermined dispersion by treating the originating solid substance of predetermined space-lattice form with a liquid reagent having low solvent power, whereby the reaction proceeds with slight change of intermolecular volume.

3. A process of preparing very disperse solids by treating an originating substance in solid form to obtain a predetermined space-lattice form, then altering the same by a non-solvent reagent solution, and removing interstitial atom-groups.

4. A process of preparing very disperse solids by treating an originating substance in solid form, having a widely-separated spacial lattice of the type of the final material but with interstitial atom-groups, with a reagent solution, whereby the interstitial atom-groups are removed from said originating substance without appreciable change of inter-molecular volume.

5. A process of producing a basic precipitate having a desired degree of dispersion, from a solid salt of a metal of which some of the basic compounds are known to be insoluble in water, which comprises the step of treating such salt in the form of a solid having an adjusted degree of condensation of its basic oxid constituent, with an alkaline material, to produce a locally confined reaction, with the formation of a precipitate occupying the space originally occupied by said salt.

6. A process, as herein described, which comprises treating a solid salt having an insoluble base with a precipitant to produce said base in the form of a precipitate ($a$) the concentration of base in said salt, and ($b$) the concentration of the precipitant, both being adjusted relatively to the desired volume-weight of the precipitate to be formed, and ($c$) the precipitation being carried out under locally confined conditions.

7. The treatment of a solid sulfate salt of an insoluble base, with a solution of an alkali to form a precipitate of a basic character, the concentration of such insoluble base in the mass of said solid salt being adjusted to the desired degree of dispersion of the precipitate.

8. In the precipitation of basic compounds, the treatment of a solid salt with an alkaline reagent, while ($a$) adjusting the degree of condensation of the salt from which the precipitation is to be effected, ($b$) adjusting the concentration of the precipitant, and ($c$) locally confining the reaction, substantially as and for the purpose hereinabove described.

Dr. VOLKMAR KOHLSCHÜTTER.

Witnesses:
E. N. HERRMAN,
R. HEINGARTNER.